(12) United States Patent
Ni et al.

(10) Patent No.: US 11,548,446 B2
(45) Date of Patent: Jan. 10, 2023

(54) VEHICLE RACK

(71) Applicant: FORCOME (ZHEJIANG) CO., LTD., Jinhua (CN)

(72) Inventors: Xiaojun Ni, Jinhua (CN); Chengsheng Fang, Jinhua (CN); Jing Xiong, Jinhua (CN); Jiancheng Wang, Jinhua (CN)

(73) Assignee: FORCOME (ZHEJIANG) CO., LTD., Zhejiang (CN)

( * ) Notice: Subject to any disclaimer, the term of this patent is extended or adjusted under 35 U.S.C. 154(b) by 55 days.

(21) Appl. No.: 16/780,861

(22) Filed: Feb. 3, 2020

(65) Prior Publication Data

US 2020/0406827 A1    Dec. 31, 2020

(30) Foreign Application Priority Data

Jun. 28, 2019   (CN) .......................... 201920988836.5

(51) Int. Cl.
     *B60R 9/058*      (2006.01)
(52) U.S. Cl.
     CPC .................................... *B60R 9/058* (2013.01)
(58) Field of Classification Search
     CPC ...................................................... B60R 9/058
     USPC ........................................................ 224/315
     See application file for complete search history.

(56) References Cited

U.S. PATENT DOCUMENTS

| | | | | |
|---|---|---|---|---|
| 3,594,035 A | * | 7/1971 | Ferguson | B60P 3/40 296/3 |
| 3,677,451 A | * | 7/1972 | Borland | B60R 9/048 224/330 |
| 5,108,141 A | * | 4/1992 | Anderson | B60R 9/00 296/3 |
| 5,494,327 A | * | 2/1996 | Derecktor | B60P 3/40 224/544 |
| 5,848,743 A | * | 12/1998 | Derecktor | B60R 9/058 224/322 |
| 5,927,782 A | * | 7/1999 | Olms | B60R 9/00 224/403 |
| 6,971,563 B2 | * | 12/2005 | Levi | B60R 9/0423 224/403 |
| 7,464,977 B1 | * | 12/2008 | Price | B60P 3/40 296/26.05 |
| D624,005 S | * | 9/2010 | Winner | D12/412 |
| 8,322,582 B2 | * | 12/2012 | Flaherty | B60R 9/00 224/405 |
| 9,493,123 B2 | * | 11/2016 | Martin | B60R 9/00 |
| 9,566,914 B2 | * | 2/2017 | Marr, Jr. | B60R 9/06 |

(Continued)

*Primary Examiner* — Scott T McNurlen
*Assistant Examiner* — Lester L Vanterpool
(74) *Attorney, Agent, or Firm* — SZDC Law P.C.

(57) ABSTRACT

A vehicle rack includes two cross beams, the cross beams being hollow square rods parallelly placed, the bottom center of the cross beam being provided with a sliding slot along the beams; two fixing rods, the fixing rods being hollow and each including an H-shaped reinforcing seat, the H-shaped reinforcing seat forming an upper sliding slot I on a top surface of the fixing rod and forming a lower sliding slot I on a bottom surface of the fixing rod, the fixing rods being particular to the two cross beams; a plurality of connecting seat, the connecting seats movably connecting the cross beams and the fixing rods, the connecting seats including upper bolt connecting parts; a plurality of supporting frames, the fixing rods each connecting two supporting frames, the supporting frames including lower bolt connecting parts.

4 Claims, 6 Drawing Sheets

(56) References Cited

U.S. PATENT DOCUMENTS

| | | | |
|---|---|---|---|
| 9,586,629 B2* | 3/2017 | Leitner | B60R 11/06 |
| 10,421,385 B2* | 9/2019 | Chambers | B62D 33/0207 |
| 2008/0100075 A1* | 5/2008 | Derecktor | B60P 3/40 |
| | | | 296/3 |
| 2009/0166390 A1* | 7/2009 | Flaherty | B60R 9/00 |
| | | | 224/403 |

* cited by examiner

VEHICLE RACK

This application claims priority to Chinese Patent Application No.: 201920988836.5, filed Jun. 28, 2019, which is incorporated by reference for all purposes as if fully set forth herein.

TECHNICAL FIELD

This application relates to a vehicle rack.

BACKGROUND TECHNOLOGY

For some self-contained small vehicles and pickup vehicles, the length and width of their trailer are relatively small. For goods that need to be transported longer or goods that is wider, a vehicle frame is often needed to be fixed on the trailer to complete transportation. Due to the different dimensions of the trailer of various self-contained small vehicles and pickup vehicles, the dimensions of the vehicle rack that need to be installed are also different. In order to make the shelf be suitable for all kinds of automobile tow buckets, manufacturers of existing automobile shelves often set the width of the shelves and the spacing between the front and rear supporting frames to be adjustable. However, the beams and the supporting frames of the existing adjustable automobile shelves are connected by a hoop-like connector that wraps around the beam. Tighten the beam by tightening the bolt, so that the supporting frame is fixed with the beam. This kind of supporting frame of the vehicle frame is integrated. Its supporting frame is fixed vertically under the cross beam. That is to say, the width of the upper two beams can only be as wide as the width of the vehicle trailer and cannot exceed the width of the vehicle trailer. If the width of the goods exceeds the width of the vehicle trailer, its loading will be unstable. At the same time, it is very inconvenient to adjust the length and width of such a vehicle frame. Secondly, by connecting the supporting frame with connectors that wraps around the beam, the connectors are higher than the top of the beam, making the top of the beam uneven, and the connectors are often stuck when pushing goods over the beam. Moreover, the existing fixed buckle of the rope on the cross beam is welded and fixed. When using rope to bind the goods, the location of the goods binding does not correspond to the fixed buckle of the rope, and the location of the fixed buckle of the rope cannot be adjusted, which brings inconvenience to the binding. Moreover, the fastening bolts of the existing fixing seat are all located in the bolt sleeve welded in the fixing seat body. If the fixing seat is fixed on the fence of the vehicle trailer, the fastening bolt is fixed in the same position as the rope on fence of the car trailer, the fastening bolt of the fixing seat cannot be fixed, and the supporting frame and the fastening must be moved, which is not only more troublesome, but also may lead to inappropriate fixed position of supporting frame.

SUMMARY OF THE INVENTION

In one embodiment, a vehicle rack includes: two cross beams, the cross beams being hollow square rods parallelly placed, the bottom center of the cross beam being provided with a sliding slot along the beams; two fixing rods, the fixing rods being hollow and each including an H-shaped reinforcing seat, the H-shaped reinforcing seat forming an upper sliding slot I on a top surface of the fixing rod and forming a lower sliding slot I on a bottom surface of the fixing rod, the fixing rods being particular to the two cross beams; a plurality of connecting seat, the connecting seats movably connecting the cross beams and the fixing rods, the connecting seats including upper bolt connecting parts, upper bolts passing through the upper bolt connecting parts and clamping plates to connect the sliding slot and the upper sliding slot I; a plurality of supporting frames, the fixing rods each connecting two supporting frames, the supporting frames including lower bolt connecting parts, lower bolts passing through the lower bolt connecting parts and clamping plates to connect the supporting frames and the fixing rods.

In another embodiment, the sliding slot is provided with a square hole, and the square hole has a width larger than a width of the sliding slot.

In another embodiment, the center of the connection seat includes a reinforcing plate; and the top of the connecting seat is extended with a U-shaped body, the U-shaped body being clamped on the bottom outer side of the cross beam.

In another embodiment, the vehicle rack further includes a movable frame, the movable frame being U-shaped. The movable frame includes two vertical rods and a cross rod; and the movable frame is connected to the cross beams by the connecting seat.

In another embodiment, the fixing rod includes closed covers at both ends, and the closed covers seal both ends of the upper sliding slot I and the lower sliding slot I.

In another embodiment, the vehicle rack further includes a plurality of rope fixing buckles. Each rope fixing buckle includes a bolt head, a clamping plate, a clamping seat, and a ring buckle; the clamping seat connects the bolt head and the ring buckle; and the clamping plate connects with the sliding slot.

In another embodiment, the vehicle rack further includes a plurality of fixing seats. The fixing seats each include a lower connector, a seat body, a moving clamp and a fastening bolt; the seat body is a right-angle aluminum alloy plate and includes a sliding slot II on top, the top surface of the seat body connecting with the lower connector; the moving clamp is a C-shaped aluminum alloy clamp and includes a slider and a fastening bolt hole; and the fastening bolt passes through the fastening bolt hole to secure the seat body to a vehicle.

In another embodiment, the fastening bolt is provided with a fastening block at top.

Compared with the existing technology, the present application has the following advantages: 1. The width of the whole vehicle rack can be adjusted conveniently, and the spacing between the cross beams and the supporting frame can be adjusted freely, so that the spacing between the supporting frame and the spacing between the beams can be adjusted reasonably according to the condition of the vehicle trailer and the cargo. 2. The connecting seat is fixed directly at the bottom of the cross beam. When loading goods, the goods can be pushed along the cross beam without obstruction, so as to facilitate the loading of goods. 3. When binding goods, the fixed buckle of rope can be adjusted according to the appropriate position of goods binding, so as to make goods binding more stable and convenient. 4. When there are obstacles in the fixing seat fixing the position of the car tow bucket railing board, move the position of the moving clamp and fix it around the obstacles. It is more reasonable to fix the supporting frame without changing the position of the supporting frame and the fixing seat body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Figure 1:
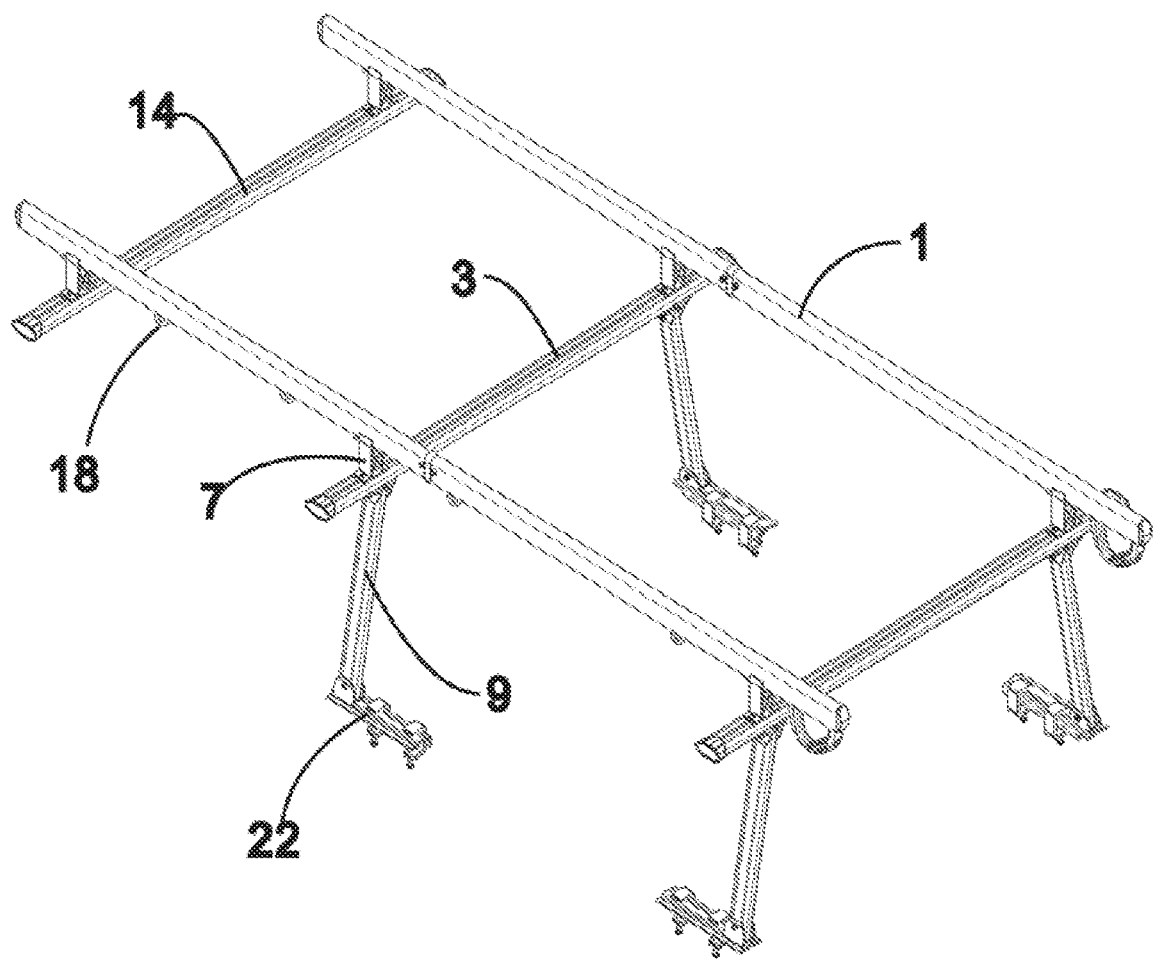
FIG. 1 is a schematic diagram of the structure of the vehicle rack described in this present application.

Label description of attached drawing: 1. Cross beams; 2. Slide slot; 3. Fixing rod; 4. H-shaped reinforcing seat; 5. Upper sliding slot I; 6. Locking sheet; 7. Connecting seat; 8. Upper and lower bolt connection parts; 9. Supporting frames; 10. Lower sliding slot I; 11. Square hole; 12. Reinforcement plate; 13. U-shaped body; 14. Mobile frame; 15. Vertical rode; 16. Cross rod; 17. Closed cover; 18. Rope fixing buckle; 19. Bolt head; 20. Ring buckle; 21. Clamping seat; 22. Fixing seat; 23. Fixing seat body; 24. Moving clamp; 25. Fastening bolts; 26. Slide slot II; 27. Slider; 28. Fastener block; 29. Clamping plates; 30. Lower connector.

DETAILED DESCRIPTION OF THE ILLUSTRATED EMBODIMENTS

Hereinafter, the present application will be described in detail with reference to the drawings and in combination with the embodiments. It should be noted that, without conflict, the embodiments in the present application and the features in the embodiments may be combined with each other.

In the description of the present application, it is necessary to understand that the terms "center," "top," "bottom," "left," "right," "vertical," "horizontal," "inside," "outside," "bottom," "top" and other indicative orientation or position relations are based on the orientation or position relations shown in the drawings. This is intended only for the convenience of describing and simplifying the description of the present application, and is not intended to indicate or imply that the device or element referred to must have a specific orientation, or be constructed and operated in a specific orientation, and therefore cannot be understood as a limitation on the new form of the utility.

Embodiment 1

Referring to FIG. 1, the vehicle frame provided in this embodiment includes beam 1, fixing rod 3, mobile frame 14, supporting frame 9, fixing seat 22, rope fixing buckle 18 and connecting seat 7, in which both beam 1 and fixing rod 3 are two, and two beam 1 are placed correspondingly. At the same time, two fixing rods 3 are crossed at the bottom of two beams 1 with beam 1. The connecting seat 7 is used to connect the cross beam 1 and the fixed bar 3, and each fixing rod 3 is fixed with two supporting frames 9 at the bottom. The bottom of the supporting frame 9 is fixed with a fixing seat 22. The mobile frame 14 is fixed with two cross beams 1 and can move back and forth along the cross beam 1.

Figure 2:
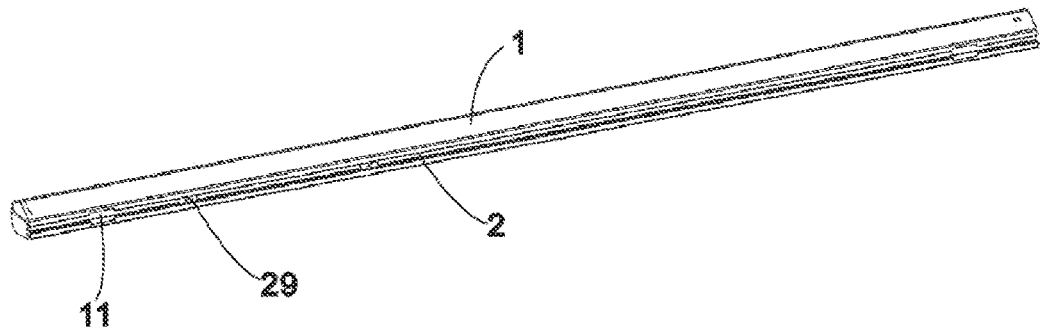
FIG. 2 is a schematic diagram of the cross beam structure described in this present application.

Referring to FIG. 2, the cross beam 1 is a square aluminum alloy hollow rod. The front end face, that is, the center of the lower bottom face in use, is provided with a sliding slot 2 along the length direction of the cross beam 1. At the same time, the sliding slot 2 is provided with a number of square holes 11 whose width is larger than the width of the sliding slot 2.

Figure 3:
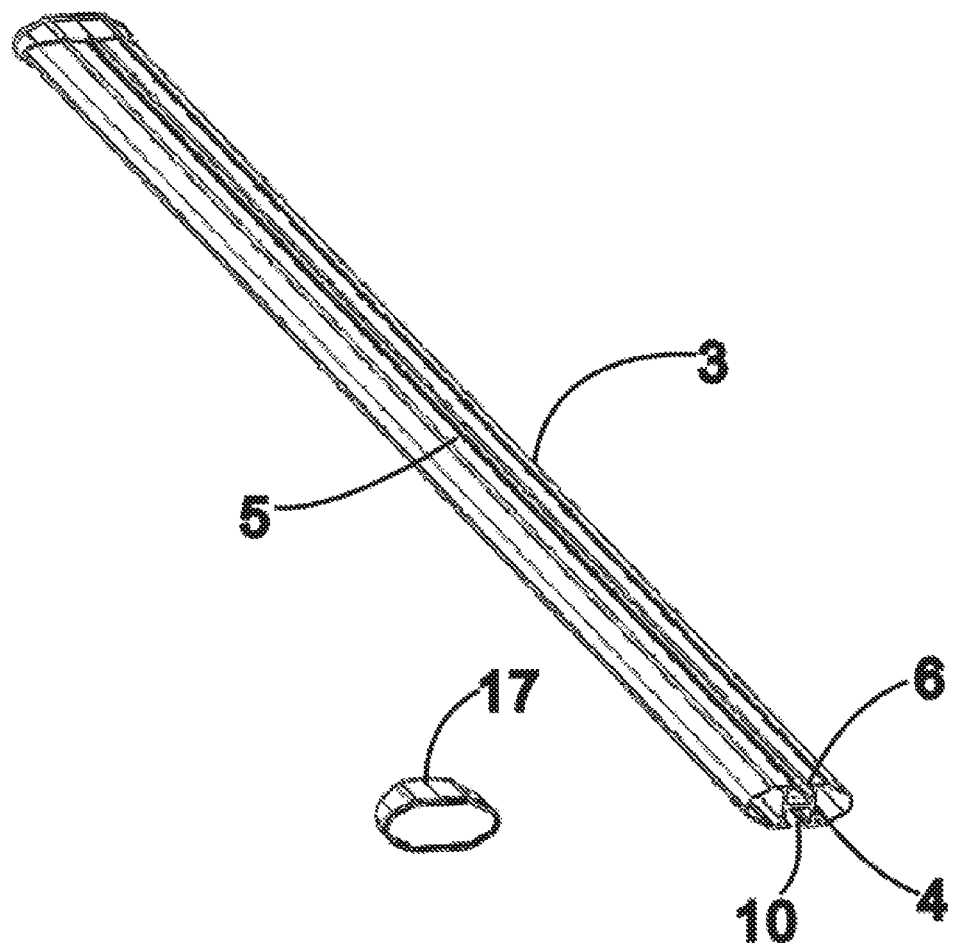
FIG. 3 is a schematic diagram of the fixing rod structure described in this present application.

Referring to FIG. 3, the fixing rod 3 is a hollow aluminum alloy tube. The center of the tube body is H-shaped reinforcing seat 4. The H-shaped reinforcing seat 4 makes the upper and lower fixing rods 3 planes to form an upper sliding slot I 5 and a lower sliding slot I 10 along the length of the fixing rod 3. At the same time, the upper sliding slot I 5 and the lower sliding slot I 10 extend with corresponding locking sheet 6. The left and right sides of the rod 3 are movably fixed with a closed cover 17, which closes the left and right sides of the upper slot I 5 and the lower slot I 10.

Figure 4:
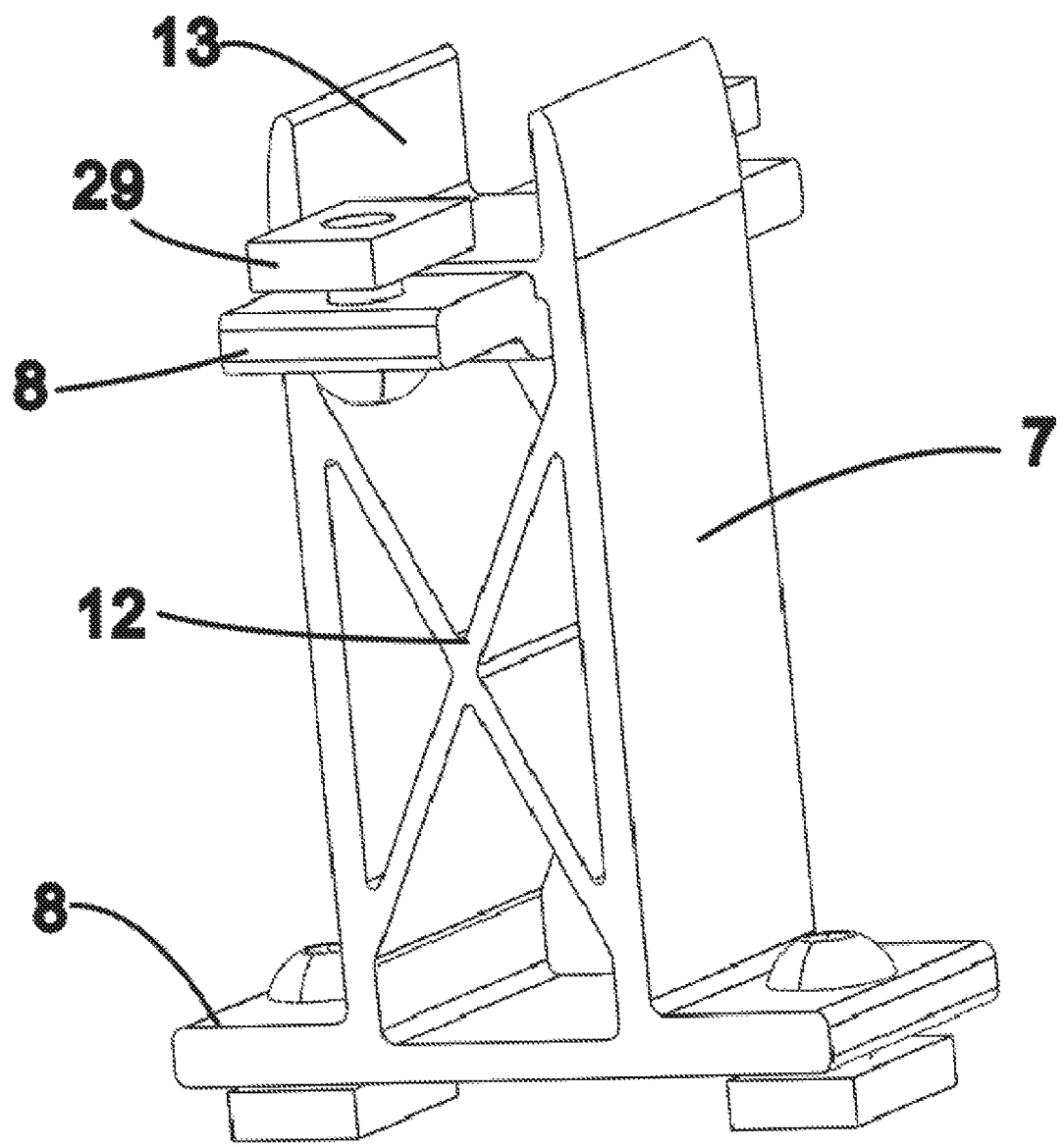
FIG. 4 is a schematic diagram of the connecting seat structure of the present application.

Referring to FIG. 4, the connecting seat 7 is an aluminum alloy cuboid with a central opening, and a reinforcing plate 12 is arranged on the two diagonals inside the opening. The two sides of the upper and lower ends of the connecting seat 7 are extended with a bolt connecting part 8. The bolt connecting part 8 is provided with bolt holes. The top bolt passes through the bolt holes from the bottom to the top and is bolted with the clamping plate 29. The bottom bolt passes through the bolt hole from top to bottom and is bolted to the other clamping plate 29. At the same time, the top of the connection seat 7 extends with a U-shaped body 13. When fixed, the clamping plate 29 at the top of the connecting seat 7 penetrates through the square hole 11 of the cross beam 1, so that the clamping plate 29 and the bolt connection 8 are on the upper and lower sides of the cross beam 1 slot 2, and the bolt is inserted into the cross beam 1 slot 2. When clamping plate 29 and bolt connection part 8 are loosened by rotating bolts, the connecting seat 7 can move along the slot 2. When the bolt is tightened, the connecting seat 7 can be fixed with the cross beam 1, while the U-shaped body 13 at the upper end of the connecting seat 7 is clamped on both sides of the lower end of the cross beam 1, which increase the stability of the connection between the cross beam 1 and the connecting seat 7. The clamping plate 29 at the lower end of the connecting seat 7 is located in the sliding slot I 5 on the fixing rod 3, and the principle of fixing the lower end of the connecting seat 7 is the same as that of the upper end.

Figure 5:
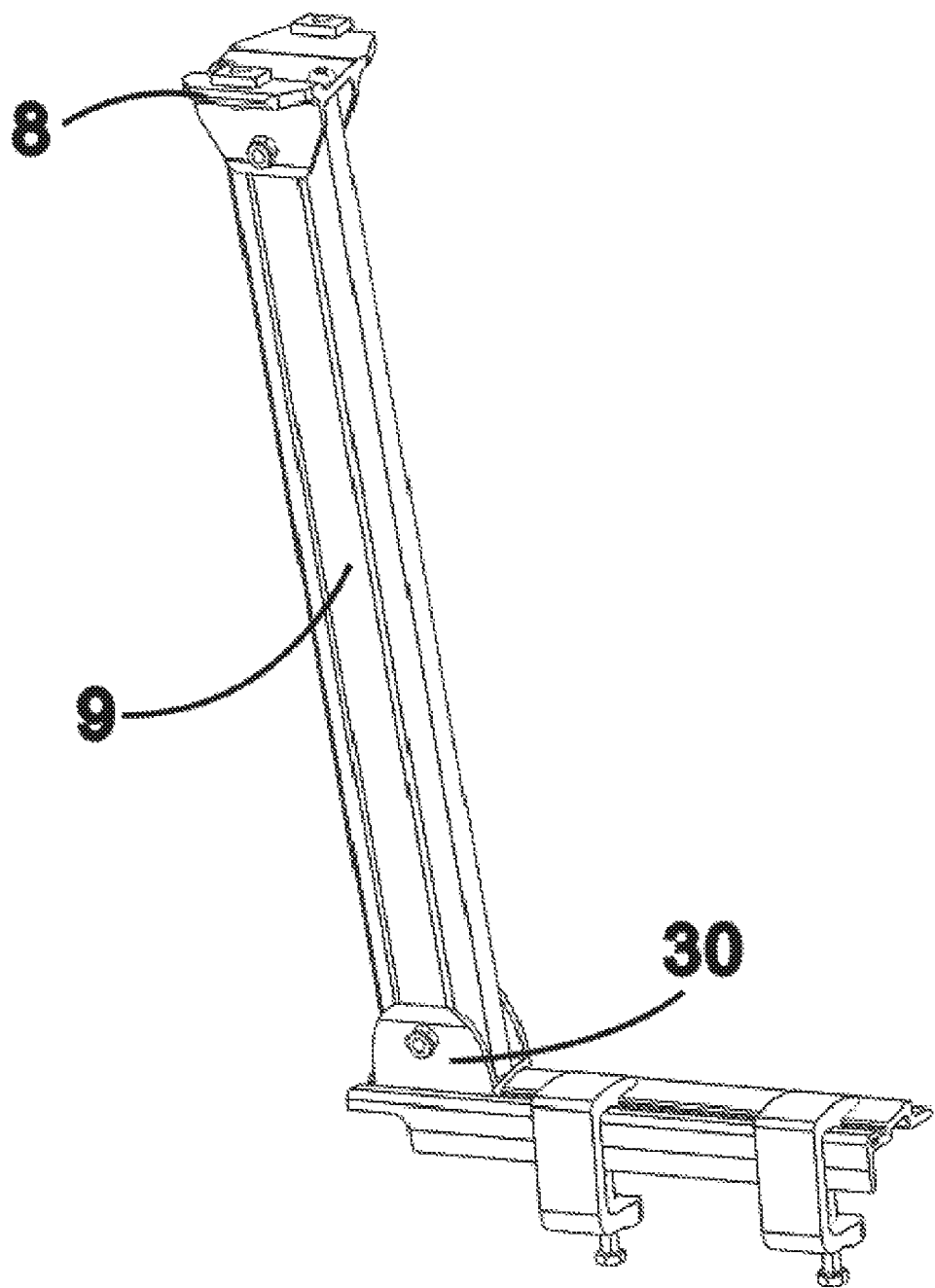
FIG. 5 is a schematic diagram of the supporting frame structure described in this present application.

Referring to FIG. 5, the upper end of the supporting frame 9 is fixed with an upper connecting head, the lower end is fixed with a lower connecting head 30, the lower connecting head 30 of the supporting frame 9 is riveted with one end of the fixing seat body 23, the upper connecting head of the supporting frame 9 is also fixed with a bolt connecting part 8 on both sides, and the bolt connecting part 8 is provided with a bolt connecting hole, and the bolt passes through the bolt connecting hole from the bottom to the top. It is also bolted with a clamping plate 29. The connecting head of the support 9 is connected with the sliding slot I 10 of the fixing rod 3 through the clamping plate 29 and the bolt connecting part 8, and can be adjusted and fixed.

Figure 6:
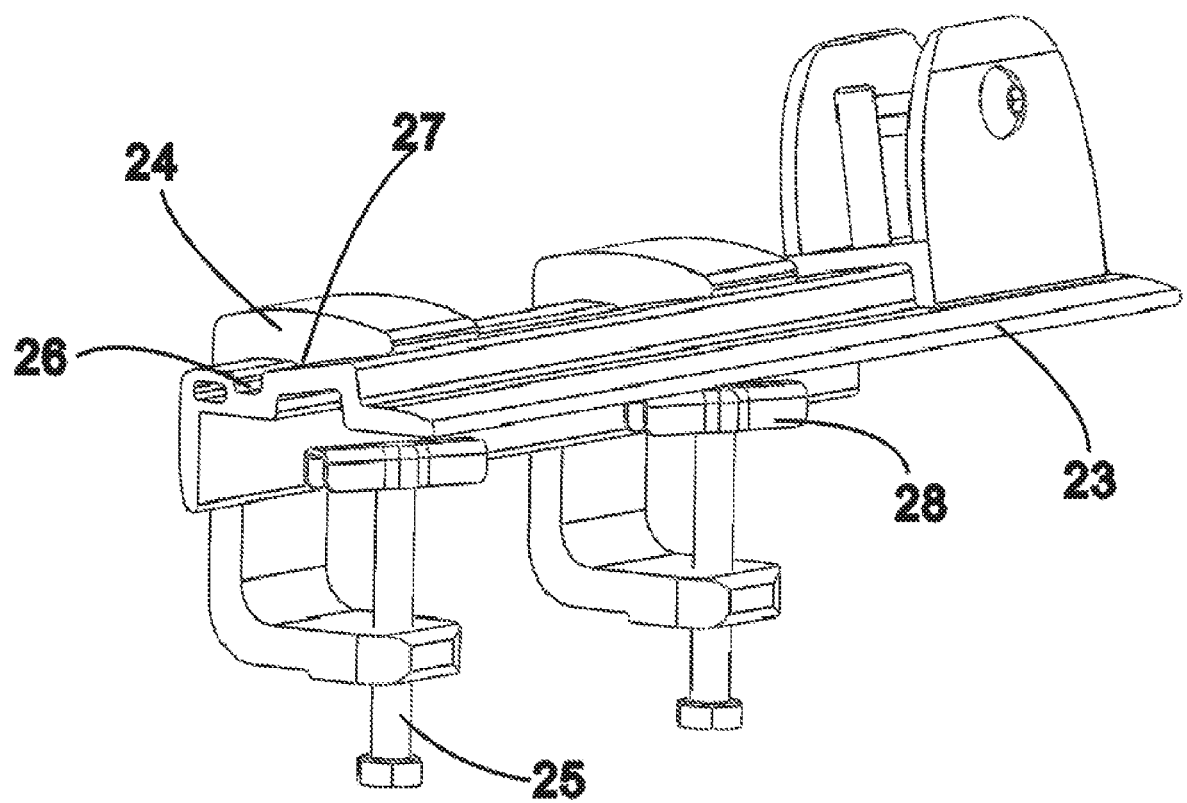
FIG. 6 is a schematic diagram of the fixing seat structure described in this present application.

Referring to FIG. 6, the fixing seat 22 includes a fixing seat body 23, a moving clamp 24 and a fastening bolt 25. The fixing seat body 23 is a right-angled aluminum alloy plate. The upper right side of the fixing seat body is riveted with the connecting head 30 under the supporting frame 9. A sliding slot II 26 is arranged on the horizontal surface of the fixing seat body 23. The moving clamp 24 is a semi-frame aluminum alloy seat, and the bottom surface of the moving clamp is extended with a strip slide block 27, of which the lower end face has a fastening bolt hole. A fastening bolt 25 is rotated inside the fastening bolt hole, and a fastening block 28 is fixed at the top of the fastening bolt 25. As a preferred choice, the above moving clip is two, the sliding block 27 of the moving clamp 24 is clamped in the sliding slot II 26. The vertical surface of the moving clamp 24 is set against the fixing seat 23. When in use, the upper end surface of the fixing seat 23 is set against the frame of the vehicle fixing trailer fence, and the lower end surface of the moving clamp 24 is set under the vehicle fixing trailer fence. The fixing seat 22 and the vehicle fixing trailer fence are fixed by the fastening block 28 at the upper end of fastening bolt 25 reaching tightly to the lower side of the frame of the vehicle fixing trailer fence. When the fixed position of moving clamp 24 meets obstacles. When the fixed position of the moving clamp 24 meets obstacles, loosen the fastening bolt 25 so that the moving clamp 24 slides along the fixing seat body 23 to adjust the fixed position.

Figure 7:
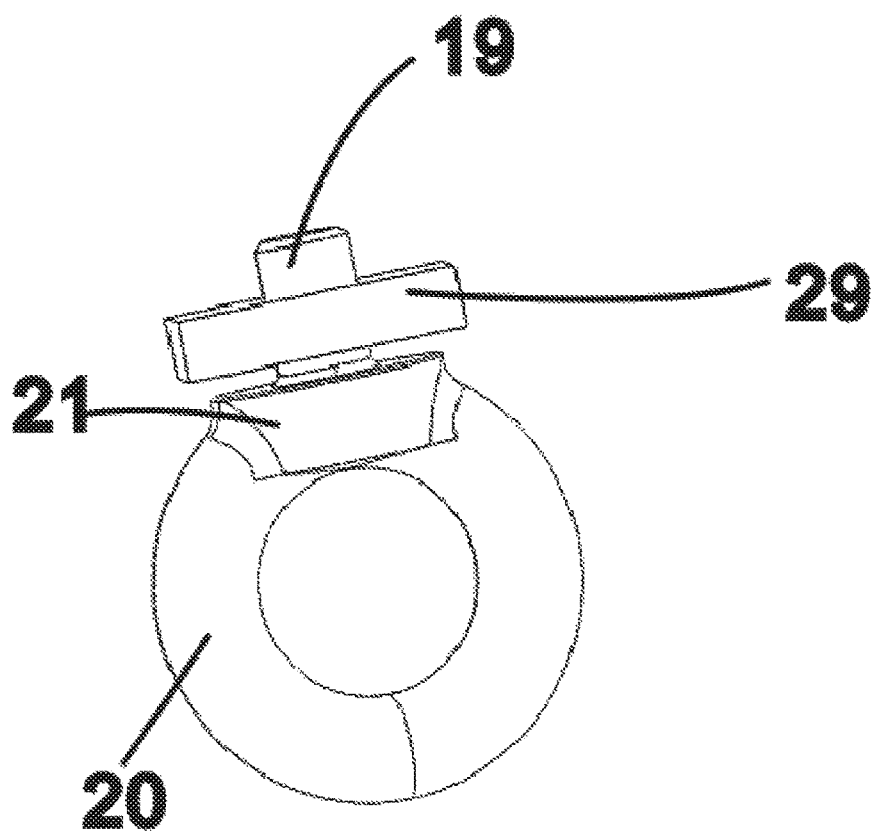
FIG. 7 is a schematic diagram of the structure of the rope fixing buckle described in this present application.

Referring to FIG. 7, the above-mentioned rope faxing buckle 18 consists of a ring buckle 20 at the bottom and a clamping seat 21 fixed at the top of the ring buckle 20. The center hole is opened at the center of the ring buckle 20. The top of the clamping seat 21 is fixed with a bolt head 19, and the top of the bolt head 19 is bolted with a clamping plate 29. The clamping plate 29 of the rope fixing buckle 18 also pass through the square hole on the slot 2 under the cross beam 1, so as to make the clamping plate 29 and the clamping seat 21 of the rope fixing buckle 18 locate on the upper and lower sides of the slot 2 respectively. The bolt head 19 of the center of the clamping seat 21 is inserted in the slot 2. When the clamping seat 21 and the clamping plate 29 of the rope fixing buckle 18 are relaxed, the rope fixing buckle 18 can move along the slot 2 of the cross beam 1. After rotating the ring buckle 20 of the rope fixing buckle 18, the clamping plate 29 and clamping seat 21 can clamp the upper and lower sides of the beam 1 slide 2 and be fixed with the beam 1.

Figure 8:
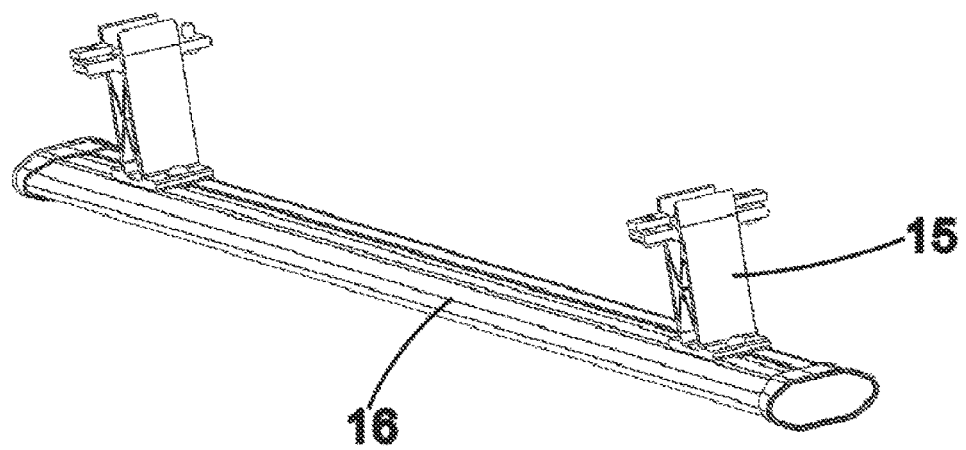
FIG. 8 is a schematic diagram of the mobile frame structure described in this present application.

Referring to FIG. 8, the mobile frame 14 is composed of a vertical rod 15 on both sides and a horizontal rod 16 connecting the two vertical rods 15. The structure of the vertical rod 15 is the same as that of the connecting seat 7, and the structure of the horizontal rod 16 is the same as that of the fixing rod 3.

For the vehicle shelves with the above structure, the supporting frame 9 is movably fixed below the fixing rod 3, the two cross beams 1 are fixed on the fixing rod 3 through the connecting seat 7. At the same time, the length of the fixing rod 3 is preferred to exceed the width of the vehicle trailer. When the width of the goods carried exceeds the width of the vehicle trailer, the connecting seat 7 below the two cross beams 1 can be moved to the two ends of the fixing rode along the upper slot I 5 of the fixing rod 3, so as to move the connecting seat 7 to the outer side of the supporting frame 9, so that the width of the two cross beams 1 exceeds the width of the car tow bucket and support the super-wide cargo more stably. At the same time, the width between the two beams 1 and the supporting frame 9 is adjusted separately, so all kinds of models are very convenient to transport all kinds of goods, the limit of goods by the beam will also be very in place. Secondly, it is connected with connecting seat 7 through the slot 2 under beam 1, which is convenient to adjust the support spacing of connecting seat 7 under beam 1, and make the top of beam 1 smooth. When loading the goods, the goods can be moved along the beam 1 without obstruction, so as to facilitate the loading of the goods. Moreover, the pull rope fixing buckle 18 is located in the chute 2 below beam 1, and can slide along the chute 2 of beam 1. When binding goods, the tie rope fixed buckle 18 can be adjusted according to the suitable position of the goods bundled, which makes the goods bundled more stable. At the same time, the moving clamp 24 of the fixing seat 22 and the seat body of the fixing seat 23 can slide along the seat body of the fixing seat 22 through the combination of slider 27 and slot II 26. When there is an obstacle in the position of fixing seat 22 fixed vehicle trailer fence, the position of clamp 24 can be moved to bypass the obstacle and then be fixed. There is no need to change the position of supporting frame and fixing seat body, which is more reasonable to fix the supporting frame It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A vehicle rack comprising:
   two cross beams, the cross beams being hollow square rods parallelly placed, the bottom center of the cross beam being provided with a sliding slot along the beams;
   two fixing rods, the fixing rods being hollow and each including an H-shaped reinforcing seat, the H-shaped reinforcing seat forming an upper sliding slot I on a top surface of the fixing rod and forming a lower sliding slot I on a bottom surface of the fixing rod, the fixing rods being particular to and located below the two cross beams;
   a plurality of connecting seats, the connecting seats movably connecting the cross beams and the fixing rods, the connecting seats including upper bolt connecting parts, upper bolts passing through the upper bolt connecting parts and clamping plates to connect the sliding slot and the upper sliding slot I;
   a plurality of supporting frames, the fixing rods each connecting two supporting frames, the supporting frames including lower bolt connecting parts, lower bolts passing through the lower bolt connecting parts and clamping plates to connect the supporting frames and the fixing rods;
   a mobile frame, the mobile frame being U-shaped, wherein the mobile frame includes two vertical rods and a cross rod; the two vertical rods and the cross rod form a U shape; the cross rod is located below the cross beams; and the mobile frame is connected to the cross beams by the connecting seats and is adapted for moving back and forth under the cross beams; and
   a plurality of fixing seats, wherein:
     the fixing seats each include a lower connector, a seat body, a moving clamp and a fastening bolt;
     the seat body is a right-angle aluminum alloy plate and includes a sliding slot II on top, the top surface of the seat body connecting with the lower connector;
     the moving clamp is a C-shaped aluminum alloy clamp and includes a slider and a fastening bolt hole;
     the fastening bolt passes through the fastening bolt hole to secure the seat body to a vehicle; and
     the fastening bolt is provided with a fastening block at top, wherein:
the center of the connecting seats includes a reinforcing plate; and
the top of the connecting seats is extended with a U-shaped body, the U-shaped body being clamped on the bottom outer side of the cross beam.

2. The vehicle rack according to claim 1, wherein:
the sliding slot is provided with a square hole, and
the square hole has a width larger than a width of the sliding slot.

3. The vehicle rack according to claim 1, wherein:
the fixing rod includes closed covers at both ends, and the closed covers seal both ends of the upper sliding slot I and the lower sliding slot I.

4. The vehicle rack according to claim 1, further comprising a plurality of rope fixing buckles,
wherein each rope fixing buckle includes a bolt head, a clamping plate, a clamping seat, and a ring buckle; the clamping seat connects the bolt head and the ring buckle; and the clamping plate connects with the sliding slot.

\* \* \* \* \*